(12) United States Patent
Bower et al.

(10) Patent No.: US 11,742,683 B2
(45) Date of Patent: Aug. 29, 2023

(54) MANAGING STORAGE OF ELECTRICAL ENERGY

(71) Applicant: Toyota Motor Engineering & Manufacturing North America, Inc., Plano, TX (US)

(72) Inventors: Laura Bower, Whitmore Lake, MI (US); Luke A. Rippelmeyer, Plano, TX (US); Takehito Yokoo, Aliso Viejo, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 79 days.

(21) Appl. No.: 17/230,223

(22) Filed: Apr. 14, 2021

(65) Prior Publication Data

US 2022/0337076 A1 Oct. 20, 2022

(51) Int. Cl.
*H02J 7/00* (2006.01)
*B60L 7/16* (2006.01)
(Continued)

(52) U.S. Cl.
CPC .............. *H02J 7/0068* (2013.01); *B60L 7/16* (2013.01); *B60L 58/12* (2019.02); *B60L 58/18* (2019.02);
(Continued)

(58) Field of Classification Search
None
See application file for complete search history.

(56) References Cited

U.S. PATENT DOCUMENTS

| 5,770,909 A | 6/1998 | Rosen et al. |
| 6,938,713 B1 | 9/2005 | Tahara et al. |
| (Continued) | | |

FOREIGN PATENT DOCUMENTS

| CN | 108233817 B | 6/2018 |
| EP | 2030829 A1 | 3/2009 |
| (Continued) | | |

OTHER PUBLICATIONS

International Search Report and Written Opinion, PCT Application No. PCT/US2022/023781, "Managing Storage of Electrical Energy," 11 pages.

(Continued)

*Primary Examiner* — Jared Fureman
*Assistant Examiner* — Joel Barnett
(74) *Attorney, Agent, or Firm* — Christopher G. Darrow; DARROW MUSTAFA PC

(57) ABSTRACT

A system for managing storage of electrical energy can include an electromagnetic machine and a controller. The electromagnetic machine can have a rotor and a stator. The rotor can be configured to be connected to a shaft. One of the rotor or the stator can have first windings and second windings. The controller can be configured to control first circuitry and second circuitry. The first circuitry can be configured to cause energy to flow from a first energy storage device to the first windings to cause the shaft to rotate. The second circuitry can be configured to cause energy to flow selectively: (1) from a second energy storage device to the second windings to cause the shaft to rotate or (2) from the second windings to the second energy storage device to cause the second energy storage device to be charged.

23 Claims, 8 Drawing Sheets

(51) Int. Cl.
*H02K 7/00* (2006.01)
*B60L 58/12* (2019.01)
*B60L 58/30* (2019.01)
*B60L 58/40* (2019.01)
*B60L 58/18* (2019.01)
*H02J 7/34* (2006.01)

(52) U.S. Cl.
CPC ............... *B60L 58/30* (2019.02); *B60L 58/40* (2019.02); *H02J 7/0013* (2013.01); *H02K 7/003* (2013.01); *B60L 2240/64* (2013.01); *B60L 2240/68* (2013.01); *H02J 7/345* (2013.01); *H02J 2207/50* (2020.01)

(56) References Cited

U.S. PATENT DOCUMENTS

| | | | |
|---|---|---|---|
| 7,489,101 | B2 | 2/2009 | Bockelmann et al. |
| 7,514,905 | B2 | 4/2009 | Kawahara et al. |
| 8,618,771 | B2 | 12/2013 | Ichikawa |
| 9,610,845 | B2 | 4/2017 | Namudur et al. |
| 2003/0009269 | A1* | 1/2003 | Graf ................ B60K 6/54 903/917 |
| 2007/0241699 | A1 | 10/2007 | Osada et al. |
| 2011/0227438 | A1 | 9/2011 | Hassnain |
| 2016/0336928 | A1 | 11/2016 | Kuznetsov |
| 2018/0272873 | A1* | 9/2018 | Rohera ............... B60L 50/90 |
| 2018/0354492 | A1 | 12/2018 | Meyer et al. |
| 2019/0013759 | A1* | 1/2019 | Bailey ................ B63H 21/14 |
| 2019/0036336 | A1* | 1/2019 | Kuznetsov ............. H02J 3/381 |
| 2019/0351892 | A1 | 11/2019 | Tsuda |
| 2020/0189564 | A1* | 6/2020 | Booth ................ B60K 6/46 |
| 2021/0313121 | A1* | 10/2021 | Macaluso ............... B60K 1/04 |

FOREIGN PATENT DOCUMENTS

| | | |
|---|---|---|
| JP | 2013162667 A | 8/2013 |
| WO | 2008151203 A1 | 12/2008 |

OTHER PUBLICATIONS

Unknown, "Battery management system," last accessed on Apr. 8, 2021, 8 pages, found at https://en.wikipedia.org/wiki/Battery_management_system.

Graver et al., "Quantifying the Microscale Activity, Energy Use, and Emissions of a Plug-In Hybrid Electric Vehicle Based on In-Use Data," Environmental Science & Technology, vol. 45, pp. 9044-9051, 2011.

Unknown, "Regenerative brake," last accessed on Mar. 22, 2021, 15 pages, found at https://en.wikipedia.org/wiki/Regenerative_brake.

Unknown, "State of change," last accessed on Jan. 15, 2021, 4 pages, found at https://en.wikipedia.org/wiki/State_of_charge.

Yu et al., "A battery management system using nonlinear model predictive control for a hybrid electric vehicle," 7th IFAC Symposium on Advances in Automotive Control, The International Federation of Automatic Control Sep. 2013, Tokyo, Japan, pp. 301-306.

Unknown, "Battery charger," last accessed on Mar. 27, 2021, 12 pages, found at https://en.wikipedia.org/wiki/Battery_charger#Applications.

Unknown, "Fuell cell vehicle," last accessed Mar. 21, 2021, 23 pages, found at https://en.wikipedia.org/wiki/Fuel_cell_vehicle.

* cited by examiner

MANAGING STORAGE OF ELECTRICAL ENERGY

TECHNICAL FIELD

The disclosed technologies are directed to managing storage of electrical energy. Specifically, the disclosed technologies are directed to managing storage of electrical energy between two energy storage devices.

BACKGROUND

An engine of a conventional motor vehicle can, through a combustion process, consume a fossil fuel to produce a propulsion force. Because waste products of the combustion process can include pollutants, efforts have been made to produce the propulsion force through different mechanisms. Among such efforts have been those that can use an electric motor to produce the propulsion force. Power to the electric motor can be provided from an energy storage device. For example, the energy storage device can be a battery. Typically, the battery can be configured to be connected, as necessary, by wires to an alternating current power source in order to be recharged. Unfortunately, recharging the battery in this manner can require a duration of time that can range from twenty minutes to six hours.

SUMMARY

In an embodiment, a system for managing storage of electrical energy can include an electromagnetic machine and a controller. The electromagnetic machine can have a rotor and a stator. The rotor can be configured to be connected to a shaft. One of the rotor or the stator can have first windings and second windings. The controller can be configured to control first circuitry and second circuitry. The first circuitry can be configured to cause energy to flow from a first energy storage device to the first windings to cause the shaft to rotate. The second circuitry can be configured to cause energy to flow selectively: (1) from a second energy storage device to the second windings to cause the shaft to rotate or (2) from the second windings to the second energy storage device to cause the second energy storage device to be charged. Additionally or alternatively, the second circuitry can be configured to cause energy to flow from the second energy storage device to the second windings to cause the shaft to rotate. The first circuitry can be configured to cause energy to flow selectively: (1) from the first energy storage device to the first windings to cause the shaft to rotate or (2) from the first windings to the first energy storage device to cause the first energy storage device to be charged.

In another embodiment, a controller for managing storage of electrical energy can include first circuitry and second circuitry. The first circuitry can be configured to cause energy to flow from a first energy storage device to first windings, of an electromagnetic machine, to rotate a shaft. The electromagnetic machine can have a rotor and a stator. The rotor can be configured to be connected to the shaft. One of the rotor or the stator can have the first windings and second windings. The second circuitry can be configured to cause energy to flow selectively: (1) from a second energy storage device to the second windings to rotate the shaft or (2) from the second windings to the second energy storage device to charge the second energy storage device. Additionally or alternatively, the second circuitry can be configured to cause energy to flow from the second energy storage device to the second windings, of the electromagnetic machine, to rotate the shaft. The first circuitry can be configured to cause energy to flow selectively: (1) from the first energy storage device to the first windings to rotate the shaft or (2) from the first windings to the first energy storage device to charge the first energy storage device.

In another embodiment, a method for managing storage of electrical energy can include causing, by a controller, energy to flow from a first energy storage device to first windings, of an electromagnetic machine, to rotate a shaft. The electromagnetic machine can have a rotor and a stator. The rotor can be connected to the shaft. One of the rotor or the stator can have the first windings and second windings. The method can include causing, by the controller, energy to flow selectively: (1) from a second energy storage device to the second windings to rotate the shaft or (2) from the second windings to the second energy storage device to charge the second energy storage device. Additionally or alternatively, the method can include causing, by the controller, energy to flow from the second energy storage device to the second windings, of the electromagnetic machine, to rotate the shaft. The method can include causing, by the controller, energy to flow selectively: (1) from the first energy storage device to the first windings to rotate the shaft or (2) from the first windings to the first energy storage device to charge the first energy storage device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
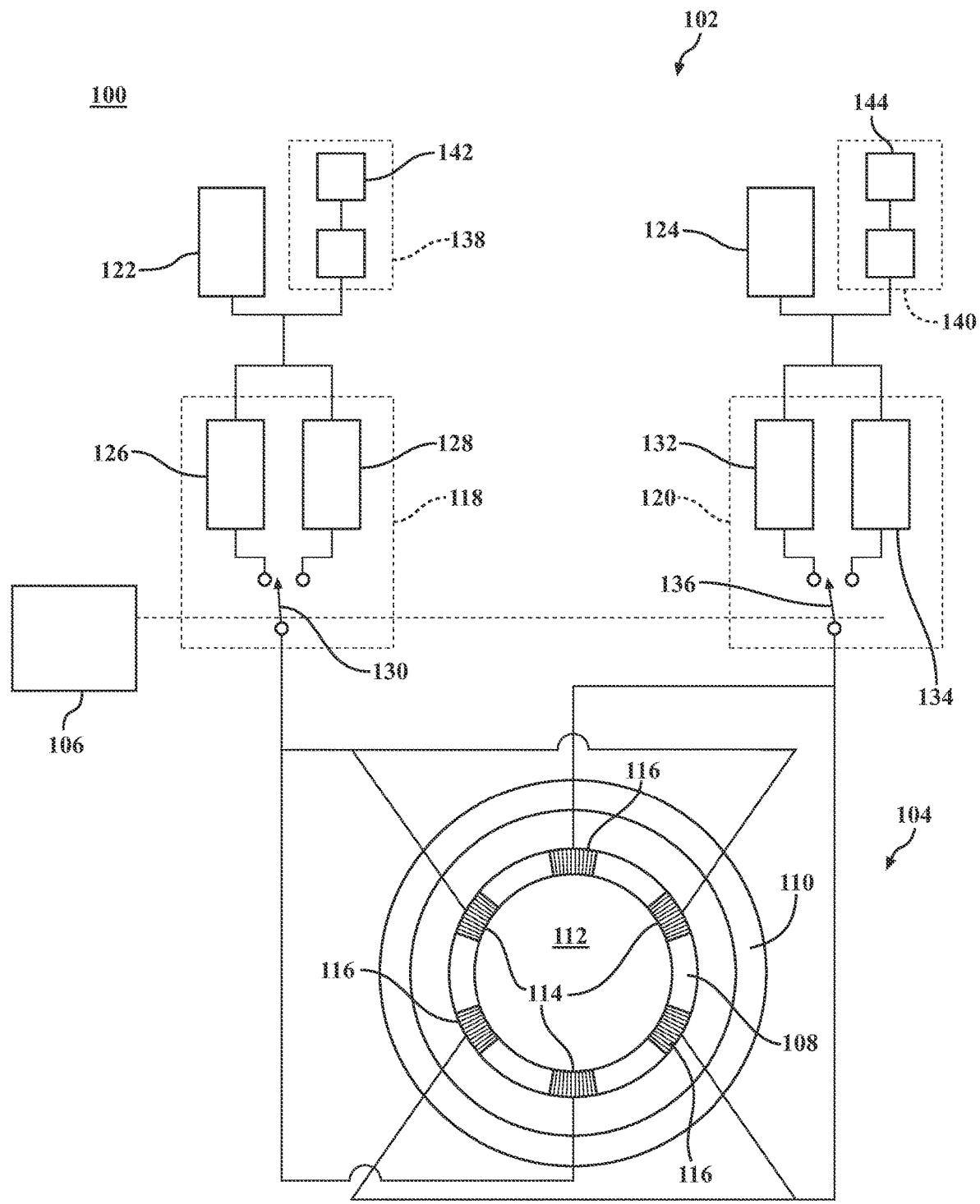
FIG. 1 is a diagram that illustrates an example of a first implementation of a system for managing storage of electrical energy, according to the disclosed technologies.

Several techniques can be used to maintain a state of charge on an energy storage device (e.g., a battery, a capacitor, or the like) on a vehicle to mitigate a burden associated with having to connect the energy storage device by wires to an alternating current power source in order to be recharged. For example, the vehicle can include a fuel cell system. The fuel cell system can include one or more fuel cells. The one or more fuel cells can be configured produce electrical energy from a chemical reaction between hydrogen and oxygen. The fuel cell system can include a hydrogen fuel tank configured to store compressed hydrogen. The fuel cell system can be configured to obtain oxygen from the atmosphere. The electrical energy can cause a motor-generator selectively to cause: (1) a driveshaft of the vehicle to rotate or (2) an energy storage device (e.g., a battery, a capacitor, or the like) to be charged. Alternatively or additionally, for example, the motor-generator can be configured to perform a regenerative braking operation. During the regenerative braking operation, at a time at which the motor-generator does not need to provide a propulsion force for the vehicle (e.g., a time at which a speed of the vehicle is being reduced, a time at which a movement of the vehicle is provided by gravity, or the like), the motor-generator can be configured to operate as a generator so that mechanical energy of a rotating driveshaft can be converted into electrical energy to cause the energy storage device (e.g., a battery, a capacitor, or the like) to be charged. Additionally or alternatively, the disclosed technologies can provide another technique to maintain the state of charge on the energy storage device (e.g., a battery, a capacitor, or the like).

The disclosed technologies can manage storage of electrical energy. The disclosed technologies can be disposed, for example, on a vehicle. The vehicle can have a first energy storage device and a second energy storage device. For example, one or more of the first energy storage device or the second energy storage device can include a battery, a capacitor, or the like. The disclosed technologies can include an electromagnetic machine that has a rotor and a stator. The rotor can be configured to be connected to a shaft. For example, the shaft can include a driveshaft of the vehicle. One of the rotor or the stator can have first windings and second windings. A controller can be configured to control first circuitry to cause energy to flow from the first energy storage device to the first windings to cause the shaft to rotate. The controller can be configured to control second circuitry to cause energy to flow selectively: (1) from the second energy storage device to the second windings to cause the shaft to rotate or (2) from the second windings to the second energy storage device to cause the second energy storage device to be charged. Additionally, for example, the first circuitry can be configured to cause energy to flow selectively: (1) from the first energy storage device to the first windings to cause the shaft to rotate or (2) from the first windings to the first energy storage device to cause the first energy storage device to be charged. In this manner, the disclosed technologies can manage storage of electrical energy between the first energy storage device and the second energy storage device.

For example, the controller can be further configured to determine an existence of a condition that warrants causing energy to be transferred from the first energy storage device to the second energy storage device. For example, the condition can include one or more of a state of charge of the first energy storage device being greater than a first threshold state of charge (e.g., 90 percent) or a state of charge of the second energy storage device being less than a second threshold state of charge (e.g., 15 percent).

For example, the electromagnetic machine can include a first motor-generator and a second motor-generator. The rotor can include a first rotor, disposed on the first motor-generator, and a second rotor disposed on the second motor-generator. The stator can include a first stator, disposed on the first motor-generator, and a second stator disposed on the second motor-generator. One of the first rotor or the first stator can have the first windings. One of the second rotor or the second stator can have the second windings. For example, one or more of the first energy storage device or the second energy storage device can include a battery. For example, the battery can include one or more of a lithium-ion battery, a lithium polymer battery, a lead-acid battery, a nickel-cadmium battery, a nickel-metal hydride battery, a zinc-air battery, a sodium nickel chloride battery, or the like. For example, one or more of the first energy storage device or the second energy storage device can include a capacitor. For example, the capacitor can include one or more of a supercapacitor, an ultracapacitor, an electrostatic double-layer capacitor, an electrochemical pseudocapacitor, a hybrid capacitor, a lithium-ion capacitor, or the like.

Figure 2:
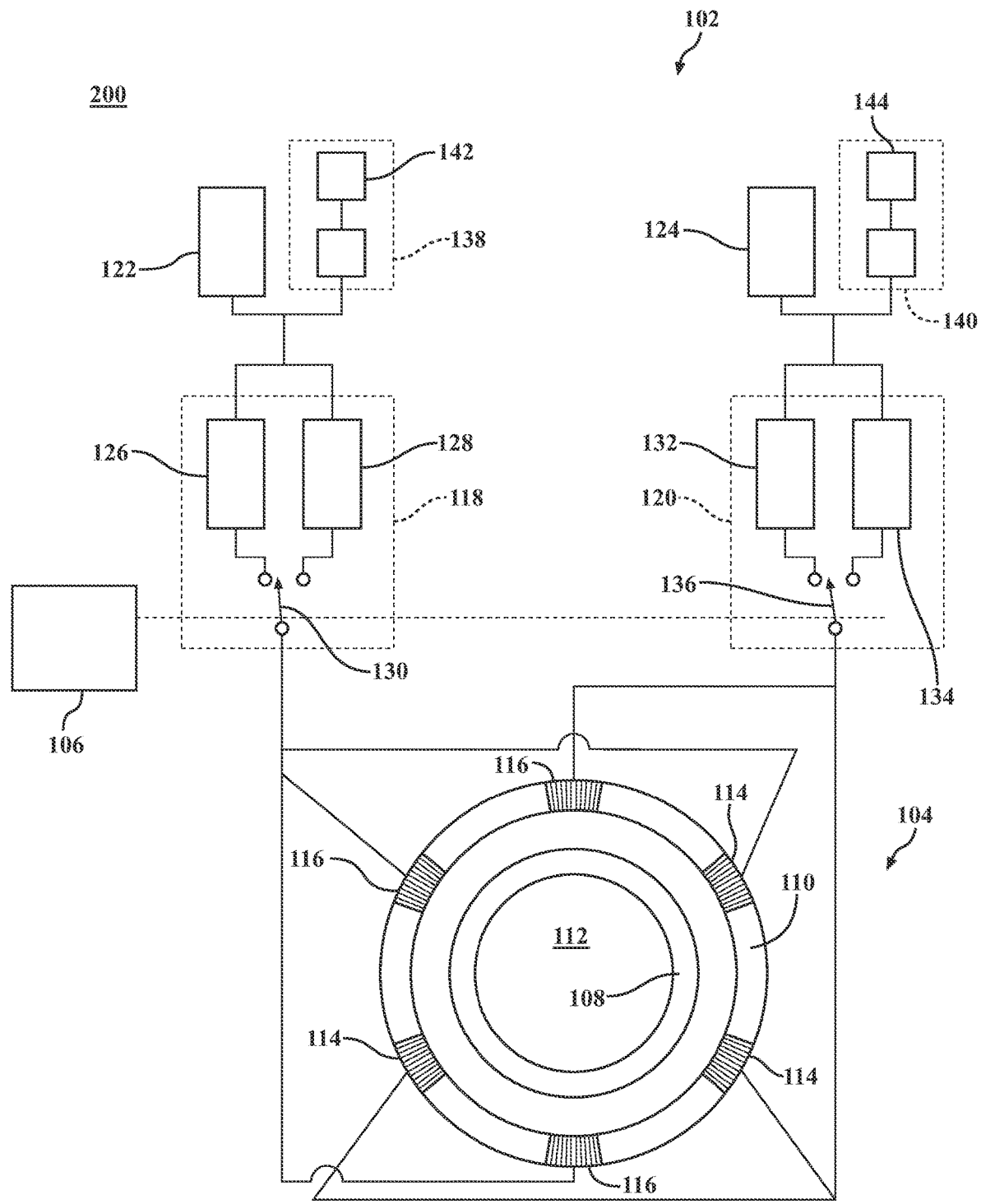
FIG. 2 is a diagram that illustrates an example of a second implementation of a system for managing storage of electrical energy, according to the disclosed technologies.

FIG. 1 is a diagram that illustrates an example of a first implementation 100 of a system for managing storage of electrical energy, according to the disclosed technologies. FIG. 2 is a diagram that illustrates an example of a second implementation 200 of a system for managing storage of electrical energy, according to the disclosed technologies. The first implementation 100 or the second implementation 200 can be disposed, for example, on a vehicle 102. For example, the first implementation 100 and the second implementation 200 can include an electromagnetic machine 104 and a controller 106.

For example, the electromagnetic machine 104 can have a rotor 108 and a stator 110. For example, the rotor 108 can be configured to be connected to a shaft 112. For example, the shaft 112 can include a driveshaft of the vehicle 102. For example, in the first implementation 100, the rotor 108 can have first windings 114 and second windings 116. For example, in the second implementation 200, the stator 110 can have the first windings 114 and the second windings 116.

For example, the controller 106 can be configured to control first circuitry 118 and second circuitry 120. The first circuitry 118 can be configured to cause energy to flow from a first energy storage device 122 to the first windings 114 to cause the shaft 112 to rotate. The second circuitry 120 can be configured to cause energy to flow selectively: (1) from a second energy storage device 124 to the second windings 116 to cause the shaft 112 to rotate or (2) from the second windings 116 to the second energy storage device 124 to cause the second energy storage device 124 to be charged. Alternatively, for example, the first circuitry 118 can be configured to cause energy to flow selectively: (1) from the first energy storage device 122 to the first windings 114 to cause the shaft 112 to rotate or (2) from the first windings 114 to the first energy storage device 122 to cause the first energy storage device 122 to be charged.

For example, the first circuitry 118 can include an inverter 126, a rectifier 128 and a switch 130. For example, the inverter 126 can be configured to cause energy to flow from the first energy storage device 122 to the first windings 114. For example, the rectifier 128 can be configured to cause energy to flow from the first windings 114 to the first energy storage device 122. For example, the switch 130 can be configured to selectively connect the first energy storage device 122 to the first windings 114 via the inverter 126 or the rectifier 128.

Likewise, for example, the second circuitry 120 can include an inverter 132, a rectifier 134, and a switch 136. For example, the inverter 132 can be configured to cause energy to flow from the second energy storage device 124 to the second windings 116. For example, the rectifier 134 can be configured to cause energy to flow from the second windings 116 to the second energy storage device 124. For example, the switch 136 can be configured to selectively connect the second energy storage device 124 to the second windings 116 via the inverter 132 or the rectifier 134.

For example, one or more of the first energy storage device 122 or the second energy storage device 124 can include a battery. For example, the battery can include one or more of a lithium-ion battery, a lithium polymer battery, a lead-acid battery, a nickel-cadmium battery, a nickel-metal hydride battery, a zinc-air battery, a sodium nickel chloride battery, or the like.

For example, one or more of the first energy storage device 122 or the second energy storage device 124 can include a capacitor. For example, the capacitor can include one or more of a supercapacitor, an ultracapacitor, an electrostatic double-layer capacitor, an electrochemical pseudocapacitor, a hybrid capacitor, a lithium-ion capacitor, or the like.

For example, the first energy storage device 122 can include a fuel cell.

Figure 3:
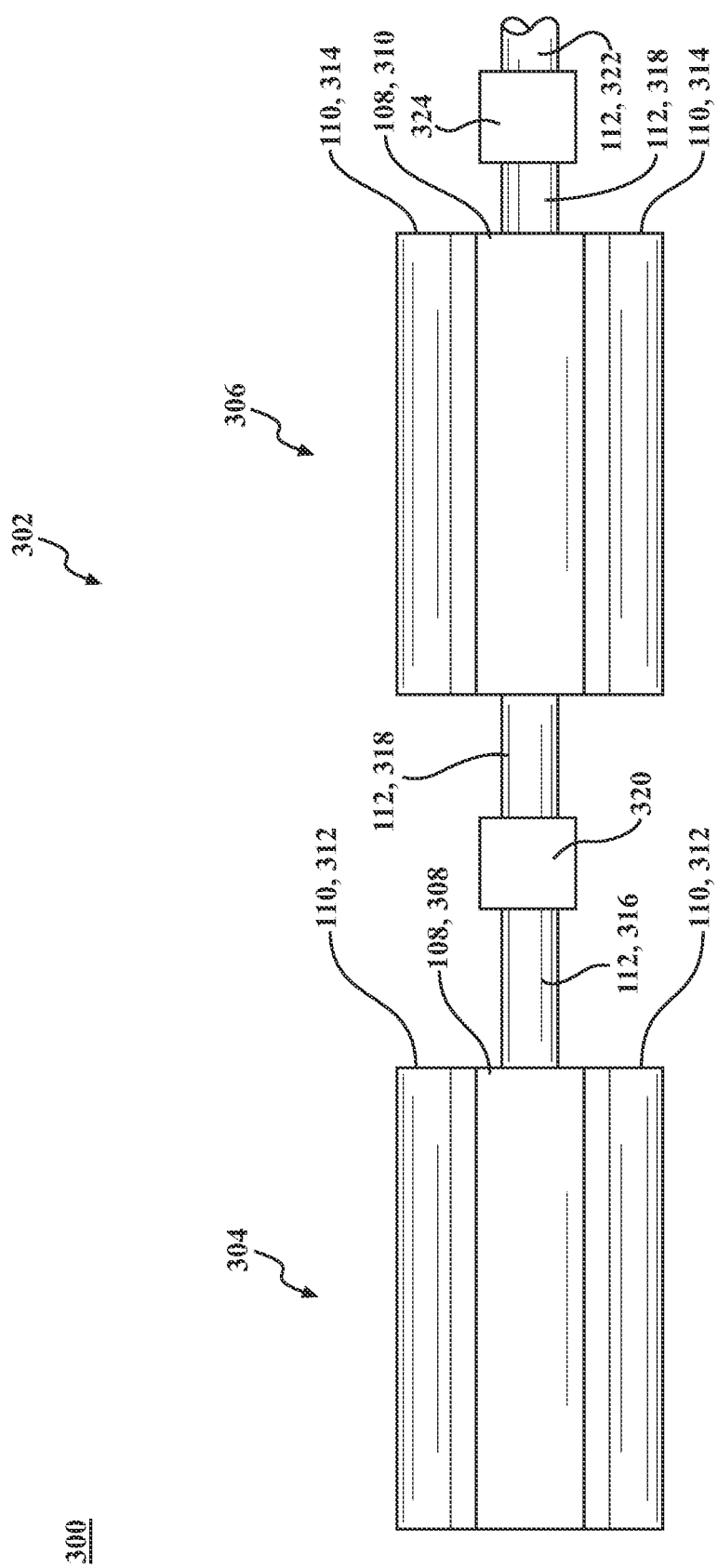
FIG. 3 is a diagram that illustrates an example of a first variation of a configuration of the first implementation or the second implementation, according to the disclosed technologies.
Figure 4:
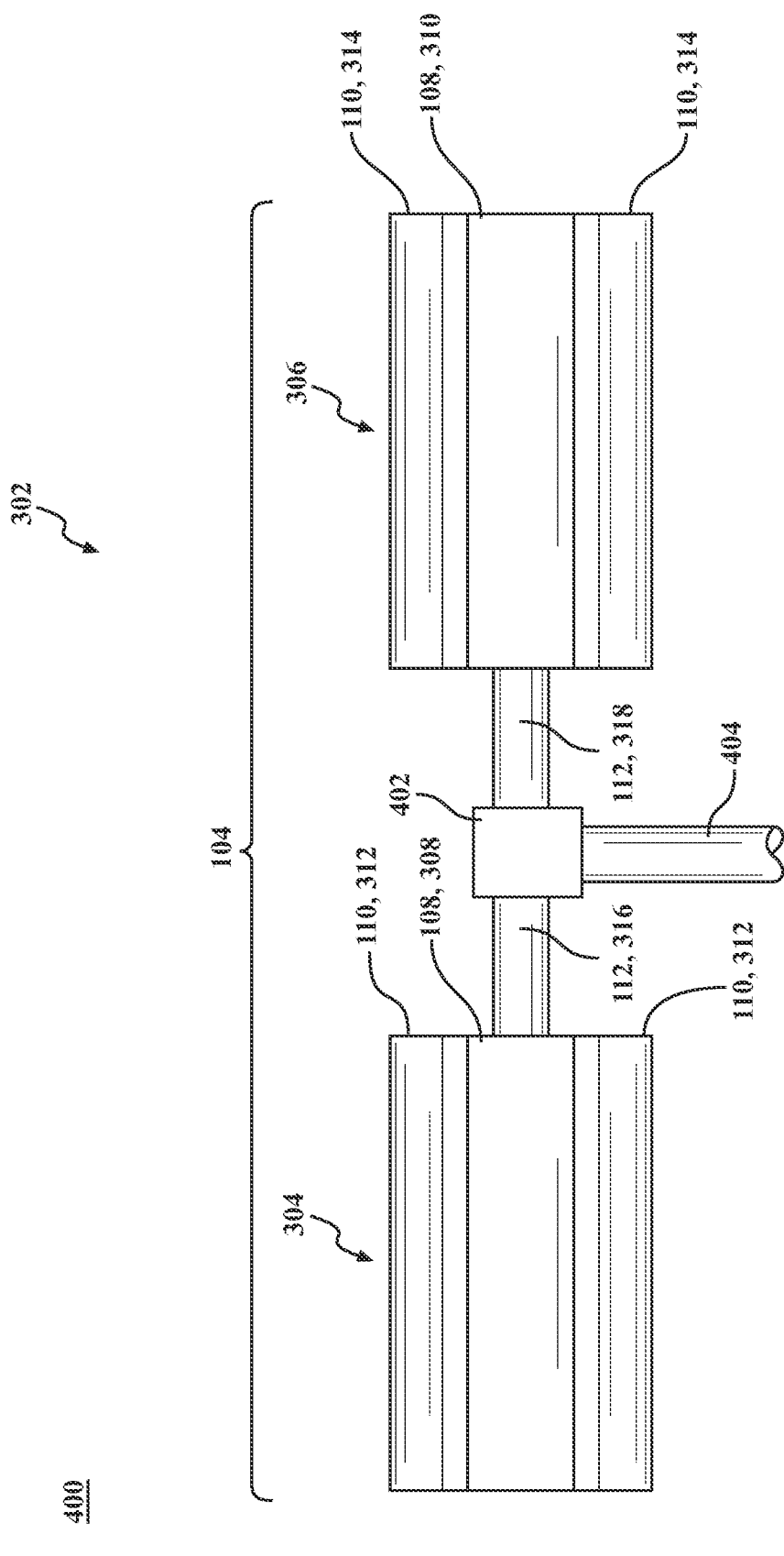
FIG. 4 is a diagram that illustrates an example of a second variation of the configuration of the first implementation or the second implementation, according to the disclosed technologies.

FIG. 3 is a diagram that illustrates an example of a first variation 300 of a first configuration 302 of the first implementation 100 or the second implementation 200, according to the disclosed technologies. FIG. 4 is a diagram that illustrates an example of a second variation 400 of the first configuration 302 of the first implementation 100 or the second implementation 200, according to the disclosed technologies. For example, in the first configuration 302, the electromagnetic machine 104 can include a first motor-generator 304 and a second motor-generator 306, the rotor 108 can include a first rotor 308 and a second rotor 310, and the stator 110 can include a first stator 312 and a second stator 314. For example, the first rotor 308 can be disposed on the first motor-generator 304, and the first stator 312 can be disposed on the first motor-generator 304. For example, the second rotor 310 can be disposed on the second motor-generator 306, and the second stator 314 can be disposed on the second motor-generator 306.

With reference to FIGS. 1-4, for example, if the first motor-generator 304 is configured according to the first implementation 100, then the first rotor 308 can have the first windings 114. However, if the first motor-generator 304 is configured according to the second implementation 200, then the first stator 312 can have the first windings 114.

For example, if the second motor-generator 306 is configured according to the first implementation 100, then the second rotor 310 can have the second windings 116. However, if the second motor-generator 306 is configured according to the second implementation 200, then the second stator 314 can have the second windings 116.

In the first configuration 302, for example, the controller 106 can be configured so that a manner in which the controller 106 controls the first circuitry 118 is independent of a manner in which the controller 106 controls the second circuitry 118. That is, for example: (1) the manner in which the controller 106 controls the first circuitry 118 to be configured to cause energy to flow selectively: (a) from the first energy storage device 122 to the first windings 114 to cause the shaft 112 to rotate or (b) from the first windings 114 to the first energy storage device 122 to cause the first energy storage device 122 to be charged can be independent of (2) the manner in which the controller 106 controls the second circuitry 120 to be configured to cause energy to flow selectively: (a) from the second energy storage device 124 to the second windings 116 to cause the shaft 112 to rotate or (b) from the second windings 116 to the second energy storage device 124 to cause the second energy storage device 124 to be charged.

In the first variation 300, the first rotor 308 and the second rotor 310 can be configured to be connected to the shaft 112. Alternatively, the shaft 112 can include a first shaft 316 and a second shaft 318. The first rotor 308 can be configured to be connected to the first shaft 316. The second rotor 310 can be configured to be connected to the second shaft 318. For example, the first shaft 316 and the second shaft 318 can be configured to be connected via one or more gears 320. Additionally or alternatively, the shaft 112 can include a third shaft 322. For example, the third shaft 322 can be configured to be connected, via one or more gears 324, to the first shaft 316 or the second shaft 318. For example, the third shaft 322 can include the driveshaft of the vehicle 102.

In the second variation 400, the shaft 112 can include the first shaft 316 and the second shaft 318. The first rotor 308 can be configured to be connected to the first shaft 316. The second rotor 310 can be configured to be connected to the second shaft 318. For example, the first shaft 316 and the second shaft 318 can be configured to be connected, via one or more gears 402, to a third shaft 404. For example, the third shaft 404 can include the driveshaft of the vehicle 102.

Returning to FIGS. 1 and 2, in a second configuration of the first implementation 100 or the second implementation 200, the controller 106 can be further configured to determine an existence of a condition that warrants causing the second circuitry 120 to be in a state to cause energy to flow from the second windings 116 to the second energy storage device 124 to charge the second energy storage device 124.

In a first variation of the second configuration, for example, the controller 106 can be further configured to: (1) receive first information indicative of a state of charge of the first energy storage device 122 and (2) receive second information indicative of a state of charge of the second energy storage device 124. For example, the condition (that warrants causing the second circuitry 120 to be in the state to cause energy to flow from the second windings 116 to the second energy storage device 124 to charge the second energy storage device 124) can include one or more of the state of charge of the first energy storage device 122 being greater than a first threshold state of charge or the state of charge of the second energy storage device 124 being less than a second threshold state of charge. For example, the first threshold state of charge can be 90 percent. For example, the second threshold state of charge can be 15 percent.

In a second variation of the second configuration, for example, the first implementation 100 or the second implementation 200 can further include a first fuel cell system 138 and a second fuel cell system 140. For example, the first fuel cell system 138 can be configured to cause energy to flow selectively to: (1) the first windings 114 to cause the shaft 112 to rotate or (2) the first energy storage device 122 to cause the first energy storage device 122 to be charged. The second fuel cell system 140 can be configured to cause energy to flow selectively to: (1) the second windings 116 to cause the shaft 112 to rotate or (2) the second energy storage device 124 to cause the second energy storage device 124 to be charged.

For example, the controller 106 can further be configured to: (1) receive first information indicative of an amount of fuel in a tank 142 of the first fuel cell system 138 and (2) receive second information indicative of an amount of fuel in a tank 144 of the second fuel cell system 140. For example, the condition (that warrants causing the second circuitry 120 to be in the state to cause energy to flow from the second windings 116 to the second energy storage device 124 to charge the second energy storage device 124) can include one or more of the amount of fuel in the tank 142 of the first fuel cell system 138 being greater than a first threshold amount or the amount of fuel in the tank 144 of the second fuel cell system 140 being less than a second threshold amount.

Additionally or alternatively, for example, the controller 106 can be further configured to receive information indicative of a measure of a state of an operation of the second fuel cell system 140. For example, the condition (that warrants causing the second circuitry 120 to be in the state to cause energy to flow from the second windings 116 to the second energy storage device 124 to charge the second energy storage device 124) can include the measure of the state of the operation of the second fuel cell system 140 being outside a threshold range of measurements. Likewise, if the first circuitry 118 is configured to cause energy to flow selectively: (1) from the first energy storage device 122 to the first windings 114 to cause the shaft 112 to rotate or (2) from the first windings 114 to the first energy storage device 122 to cause the first energy storage device 122 to be charged, then the controller 106 can be further configured to: (1) determine an existence of a condition that warrants causing the first circuitry 118 to be in a state to cause energy to flow from the first windings 114 to the first energy storage device 122 to charge the first energy storage device 122 and (2) receive information indicative of a measure of a state of an operation of the first fuel cell system 138. For example, the condition (that warrants causing the first circuitry 118 to be in the state to cause energy to flow from the first windings 114 to the first energy storage device 122 to charge the first energy storage device 122) can include the measure of the state of the operation of the first fuel cell system 138 being outside the threshold range of measurements.

In a third variation of the second configuration, for example, the first implementation 100 or the second implementation 200 can be disposed on the vehicle 102. For example, the condition (that warrants causing the second circuitry 120 to be in the state to cause energy to flow from the second windings 116 to the second energy storage device 124 to charge the second energy storage device 124) can include a situation favorable for performing a regenerative braking operation. For example, the controller 106 can be configured to: (1) analyze information about a topological relief along a path of travel of the vehicle 102 and (2) determine, based on a result of an analysis of the information about the topological relief along the path of travel of the vehicle 102, the existence of the condition. For example, the information about the topological relief along the path of travel of the vehicle 102 can be obtained from a sensor (not illustrated) disposed on the vehicle 102, a cloud computing platform (not illustrated), a high definition map (not illustrated), or the like. Additionally or alternatively, for example, the controller 106 can be configured to: (1) analyze information about a measure of changes in a rate of flow of traffic along a path of travel of the vehicle 102 and (2) determine, based on a result of an analysis of the measure of the changes in the rate of flow of traffic along the path of travel of the vehicle 102, the existence of the condition. For example, the information about the measure of the changes in the rate of flow of traffic along the path of travel of the vehicle 102 can be obtained from a vehicle-to-vehicle communications device (not illustrated), a vehicle-to-infrastructure communications device (not illustrated), a cloud computing platform (not illustrated), or the like.

Figure 5:
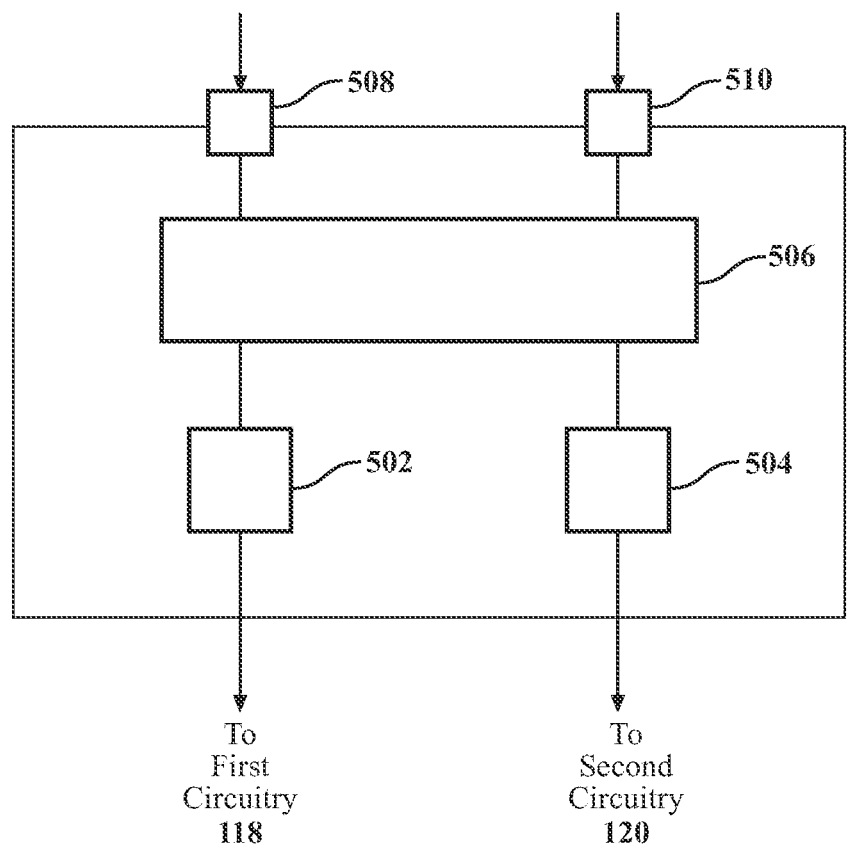
FIG. 5 is a diagram that illustrates an example of a controller for managing storage of electrical energy, according to the disclosed technologies.

FIG. 5 is a diagram that illustrates an example of a controller 500 for managing storage of electrical energy, according to the disclosed technologies. For example, the controller 500 can include first circuitry 502 and second circuitry 504. For example, the first circuitry 502 can be configured to cause energy to flow from a first energy storage device to first windings, of an electromagnetic machine, to rotate a shaft. For example, the electromagnetic machine can have a rotor and a stator. The rotor can be connected to the shaft. One of the rotor or the stator can have the first windings and second windings. For example, the second circuitry 504 can be configured to cause energy to flow selectively: (1) from a second energy storage device to the second windings to rotate the shaft or (2) from the second windings to the second energy storage device to charge the second energy storage device.

Alternatively, for example, the first circuitry 502 can be configured to cause energy to flow selectively: (1) from the first energy storage device to the first windings to rotate the shaft or (2) from the first windings to the first energy storage device to charge the first energy storage device.

Additionally, for example, the controller 500 can further include third circuitry 506. The third circuitry 506 can be configured to determine an existence of a condition that warrants causing the second circuitry 504 to be in a state to cause energy to flow from the second windings to the second energy storage device to charge the second energy storage device.

In a first variation of the controller 500, for example, the controller 500 can further include a first port 508 and a second port 510. For example, the first port 508 can be configured to receive first information indicative of a state of charge of the first energy storage device. For example, the second port 510 can be configured to receive second information indicative of a state of charge of the second energy storage device. For example, the condition (that warrants causing the second circuitry 504 to be in the state to cause energy to flow from the second windings to the second energy storage device to charge the second energy storage device) can include one or more of the state of charge of the first energy storage device being greater than a first threshold state of charge or the state of charge of the second energy storage device being less than a second threshold state of charge. For example, the first threshold state of charge can be 90 percent. For example, the second threshold state of charge can be 15 percent.

In a second variation of the controller 500, for example, the controller 500 can further include the first port 508 and the second port 510. For example, the first port 508 can be configured to receive first information indicative of an amount of fuel in a tank of a first fuel cell system. The first fuel cell system can be configured to cause energy to flow selectively to: (1) the first windings to rotate the shaft or (2) the first energy storage device to charge the first energy storage device. For example, the second port 510 can be configured to receive second information indicative of an amount of fuel in a tank of a second fuel cell system. The second fuel cell system can be configured to cause energy to flow selectively to: (1) the second windings to rotate the shaft or (2) the second energy storage device to charge the second energy storage device. For example, the condition (that warrants causing the second circuitry 504 to be in the state to cause energy to flow from the second windings to the second energy storage device to charge the second energy storage device) can include one or more of the amount of fuel in the tank of the first fuel cell system being greater than a first threshold amount or the amount of fuel in the tank of the second fuel cell system being less than a second threshold amount.

In a third variation of the controller 500, for example, the controller 500 can further include the first port 508. The first port 508 can be configured to receive information indicative of a measure of a state of an operation of the second fuel cell system. For example, the condition (that warrants causing the second circuitry 504 to be in the state to cause energy to flow from the second windings to the second energy storage device to charge the second energy storage device) can include the measure of the state of the operation of the second fuel cell system being outside a threshold range of measurements.

In a fourth variation of the controller 500, for example, the controller 500 can be configured to be disposed on a vehicle. For example, the condition (that warrants causing the second circuitry 504 to be in the state to cause energy to flow from the second windings to the second energy storage device to charge the second energy storage device) can include a situation favorable for performing a regenerative braking operation. For example, the third circuitry 506 can be configured to: (1) analyze information about a topological relief along a path of travel of the vehicle and (2) determine, based on a result of an analysis of the information about the topological relief along the path of travel of the vehicle, the existence of the condition. Additionally or alternatively, for example, the third circuitry 506 can be configured to: (1) analyze information about a measure of changes in a rate of flow of traffic along a path of travel of the vehicle and (2) determine, based on a result of an analysis of the measure of the changes in the rate of flow of traffic along the path of travel of the vehicle, the existence of the condition.

Figure 6A:
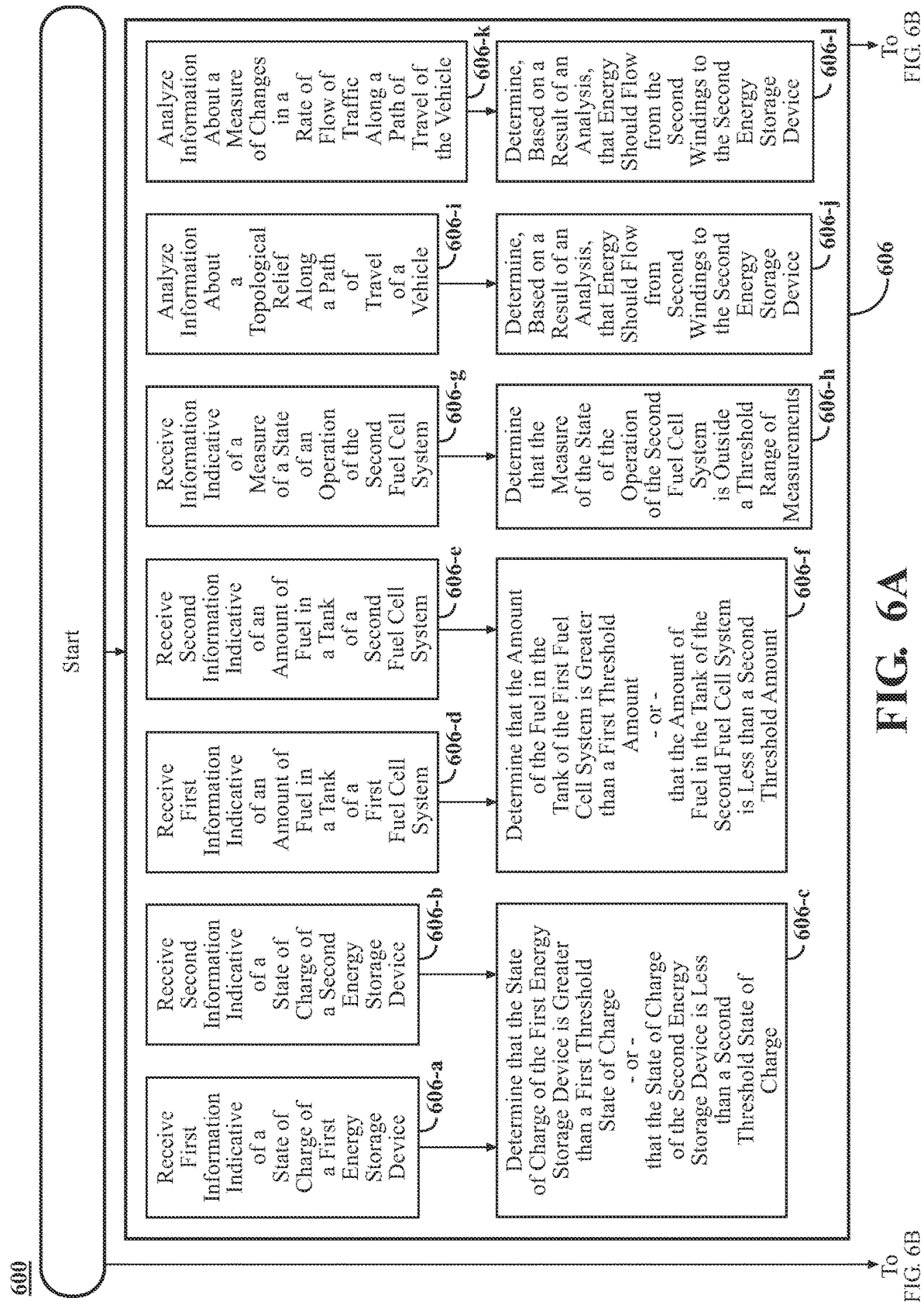
FIGS. 6A and 6B include a flow diagram that illustrates an example of a method for managing storage of electrical energy, according to the disclosed technologies.
Figure 6B:
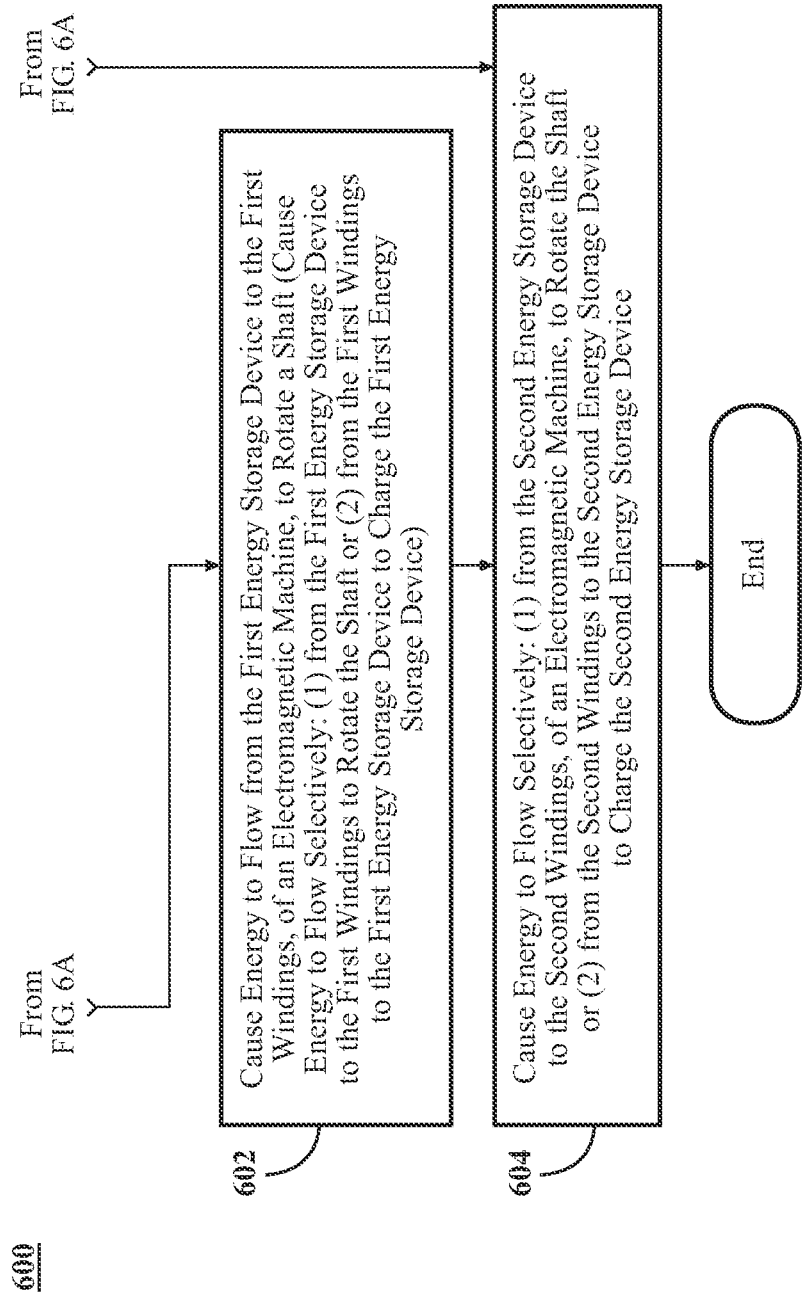

FIGS. 6A and 6B include a flow diagram that illustrates an example of a method 600 that is associated with managing storage of electrical energy, according to the disclosed technologies. The method 600 is described from the perspective of the controller 500 illustrated in FIG. 5. Although the method 600 is described in combination with the controller 500, one of skill in the art understands, in light of the description herein, that the method 600 is not limited to being implemented by the controller 500. Rather, the controller 500 is an example of a system or a device that may be used to implement the method 600.

In FIG. 6B, in the method 600, at an operation 602, for example, the controller 500 can cause energy to flow from a first energy storage device to first windings, of an electromagnetic machine, to rotate a shaft. For example, the electromagnetic machine can have a rotor and a stator. The rotor can be connected to the shaft. One of the rotor or the stator can have the first windings and second windings.

Alternatively, at the operation 602, for example, the controller 500 can cause energy to flow selectively: (1) from the first energy storage device to the first windings to rotate the shaft or (2) from the first windings to the first energy storage device to charge the first energy storage device.

At an operation 604, for example, the controller 500 can cause energy to flow selectively: (1) from a second energy storage device to the second windings, of the electromagnetic machine, to rotate the shaft or (2) from the second windings to the second energy storage device to charge the second energy storage device.

Additionally, in FIG. 6A, in the method 600, at an operation 606, for example, the controller 500 can determine an existence of a condition that warrants causing energy to flow from the second windings to the second energy storage device to charge the second energy storage device.

In a first variation of the method 600, at an operation 606-*a*, for example, the controller 500 can receive first information indicative of a state of charge of the first energy storage device.

At an operation 606-*b*, for example, the controller 500 can receive second information indicative of a state of charge of the second energy storage device.

At an operation 606-*c*, for example, the controller 500 can determine that the condition (that warrants causing energy to flow from the second windings to the second energy storage device to charge the second energy storage device) can include one or more of the state of charge of the first energy storage device being greater than a first threshold state of charge or the state of charge of the second energy storage device being less than a second threshold state of charge. For example, the first threshold state of charge can be 90 percent. For example, the second threshold state of charge can be 15 percent.

In a second variation of the method 600, at an operation 606-*d*, for example, the controller 500 can receive first information indicative of an amount of fuel in a tank of a first fuel cell system. The first fuel cell system can be configured to cause energy to flow selectively to: (1) the first windings to rotate the shaft or (2) the first energy storage device to charge the first energy storage device.

At an operation 606-*e*, for example, the controller 500 can receive second information indicative of an amount of fuel in a tank of a second fuel cell system. The second fuel cell system can be configured to cause energy to flow selectively to: (1) the second windings to rotate the shaft or (2) the second energy storage device to charge the second energy storage device.

At an operation 606-*f*, for example, the controller 500 can determine that the condition (that warrants causing energy to flow from the second windings to the second energy storage device to charge the second energy storage device) can include one or more of the amount of fuel in the tank of the first fuel cell system being greater than a first threshold amount or the amount of fuel in the tank of the second fuel cell system being less than a second threshold amount.

In a third variation of the method 600, at an operation 606-*g*, for example, the controller 500 can receive information indicative of a measure of a state of an operation of the second fuel cell system.

At an operation 606-*h*, for example, the controller 500 can determine that the condition (that warrants causing energy to flow from the second windings to the second energy storage device to charge the second energy storage device) can include the measure of the state of the operation of the second fuel cell system being outside a threshold range of measurements.

In a fourth variation of the method 600, for example, the controller 500 can be disposed on a vehicle. The condition (that warrants causing energy to flow from the second windings to the second energy storage device to charge the second energy storage device) can include a situation favorable for performing a regenerative braking operation.

At an operation 606-*i*, for example, the controller 500 can analyze information about a topological relief along a path of travel of the vehicle.

At an operation 606-*j*, for example, the controller 500 can determine, based on a result of an analysis of the information about the topological relief along the path of travel of the vehicle, the existence of the condition that warrants causing energy to flow from the second windings to the second energy storage device to charge the second energy storage device.

In a fifth variation of the method 600, for example, the controller 500 can be disposed on a vehicle. The condition (that warrants causing energy to flow from the second windings to the second energy storage device to charge the second energy storage device) can include a situation favorable for performing a regenerative braking operation.

At an operation 606-$k$, for example, the controller 500 can analyze information about a measure of changes in a rate of flow of traffic along a path of travel of the vehicle.

At an operation 606-1, for example, the controller 500 can determine, based on a result of an analysis of the measure of the changes in the rate of flow of traffic along the path of travel of the vehicle, the existence of the condition that warrants causing energy to flow from the second windings to the second energy storage device to charge the second energy storage device.

Figure 7:
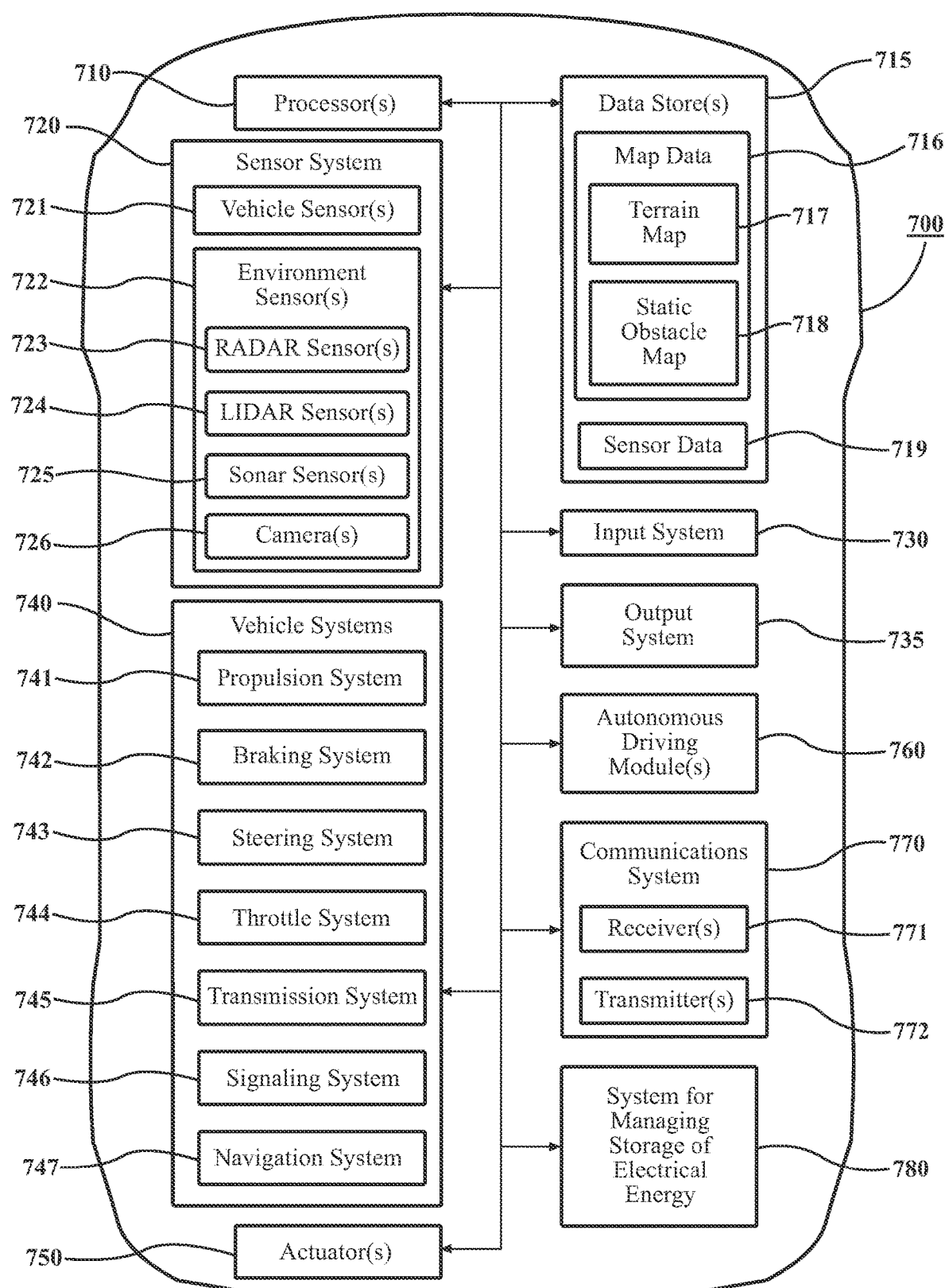
FIG. 7 includes a block diagram that illustrates an example of elements disposed on a vehicle, according to the disclosed technologies.

FIG. 7 includes a block diagram that illustrates an example of elements disposed on a vehicle 700, according to the disclosed technologies. As used herein, a "vehicle" can be any form of powered transport. In one or more implementations, the vehicle 700 can be an automobile. While arrangements described herein are with respect to automobiles, one of skill in the art understands, in light of the description herein, that embodiments are not limited to automobiles.

In some embodiments, the vehicle 700 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 700 is performed according to inputs received from a user (e.g., human driver). In one or more arrangements, the vehicle 700 can be a conventional vehicle that is configured to operate in only a manual mode.

In one or more embodiments, the vehicle 700 can be an automated vehicle. As used herein, "automated vehicle" can refer to a vehicle that operates in an automated mode. As used herein, "automated mode" can refer to navigating and/or maneuvering the vehicle 700 along a travel route using one or more computing systems to control the vehicle 700 with minimal or no input from a human driver. In one or more embodiments, the vehicle 700 can be highly automated or completely automated. In one embodiment, the vehicle 700 can be configured with one or more semi-automated operational modes in which one or more computing systems perform a portion of the navigation and/or maneuvering of the vehicle along a travel route, and a vehicle operator (i.e., driver) provides inputs to the vehicle 700 to perform a portion of the navigation and/or maneuvering of the vehicle 700 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 700 can include various elements. The vehicle 700 can have any combination of the various elements illustrated in FIG. 7. In various embodiments, it may not be necessary for the vehicle 700 to include all of the elements illustrated in FIG. 7. Furthermore, the vehicle 700 can have elements in addition to those illustrated in FIG. 7. While the various elements are illustrated in FIG. 7 as being located within the vehicle 700, one or more of these elements can be located external to the vehicle 700. Furthermore, the elements illustrated may be physically separated by large distances. For example, as described, one or more components of the disclosed system can be implemented within the vehicle 700 while other components of the system can be implemented within a cloud-computing environment, as described below. For example, the elements can include one or more processors 710, one or more data stores 715, a sensor system 720, an input system 730, an output system 735, vehicle systems 740, one or more actuators 750, one or more automated driving modules 760, a communications system 770, and a system 780 for managing storage of electrical energy. For example, the system 780 can include one or more of the first implementation 100 of the system for managing storage of electrical energy or the second implementation 200 of the system for managing storage of electrical energy.

In one or more arrangements, the one or more processors 710 can be a main processor of the vehicle 700. For example, the one or more processors 710 can be an electronic control unit (ECU). For example, functions and/or operations of the controller 106 (illustrated in FIGS. 1 and 2) or the controller 500 (illustrated in FIG. 5) can be realized by the one or more processors 710.

The one or more data stores 715 can store, for example, one or more types of data. The one or more data store 715 can include volatile memory and/or non-volatile memory. Examples of suitable memory for the one or more data stores 715 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 715 can be a component of the one or more processors 710. Additionally or alternatively, the one or more data stores 715 can be operatively connected to the one or more processors 710 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 715 can store map data 716. The map data 716 can include maps of one or more geographic areas. In some instances, the map data 716 can include information or data on roads, traffic control devices, road markings, structures, features, and/or landmarks in the one or more geographic areas. The map data 716 can be in any suitable form. In some instances, the map data 716 can include aerial views of an area. In some instances, the map data 716 can include ground views of an area, including 360-degree ground views. The map data 716 can include measurements, dimensions, distances, and/or information for one or more items included in the map data 716 and/or relative to other items included in the map data 716. The map data 716 can include a digital map with information about road geometry. The map data 716 can be high quality and/or highly detailed.

In one or more arrangements, the map data 716 can include one or more terrain maps 717. The one or more terrain maps 717 can include information about the ground, terrain, roads, surfaces, and/or other features of one or more geographic areas. The one or more terrain maps 717 can include elevation data of the one or more geographic areas. The map data 716 can be high quality and/or highly detailed. The one or more terrain maps 717 can define one or more ground surfaces, which can include paved roads, unpaved roads, land, and other things that define a ground surface.

In one or more arrangements, the map data 716 can include one or more static obstacle maps 718. The one or more static obstacle maps 718 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 718 can have location data, size data, dimension data, material data, and/or other data associated with them. The one or more static obstacle maps 718 can include measurements, dimensions, distances, and/or information for one or more static obstacles. The one or more static obstacle maps 718 can be high quality and/or highly detailed. The one or more static obstacle maps 718 can be updated to reflect changes within a mapped area.

In one or more arrangements, the one or more data stores 715 can store sensor data 719. As used herein, "sensor data" can refer to any information about the sensors with which the vehicle 700 can be equipped including the capabilities of and other information about such sensors. The sensor data 719 can relate to one or more sensors of the sensor system 720. For example, in one or more arrangements, the sensor data 719 can include information about one or more lidar sensors 724 of the sensor system 720.

In some arrangements, at least a portion of the map data 716 and/or the sensor data 719 can be located in one or more data stores 715 that are located onboard the vehicle 700. Alternatively or additionally, at least a portion of the map data 716 and/or the sensor data 719 can be located in one or more data stores 715 that are located remotely from the vehicle 700.

The sensor system 720 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 720 includes a plurality of sensors, the sensors can work independently from each other. Alternatively, two or more of the sensors can work in combination with each other. In such a case, the two or more sensors can form a sensor network. The sensor system 720 and/or the one or more sensors can be operatively connected to the one or more processors 710, the one or more data stores 715, and/or another element of the vehicle 700 (including any of the elements illustrated in FIG. 7). The sensor system 720 can acquire data of at least a portion of the external environment of the vehicle 700 (e.g., nearby vehicles). The sensor system 720 can include any suitable type of sensor. Various examples of different types of sensors are described herein. However, one of skill in the art understands that the embodiments are not limited to the particular sensors described herein.

The sensor system 720 can include one or more vehicle sensors 721. The one or more vehicle sensors 721 can detect, determine, and/or sense information about the vehicle 700 itself. In one or more arrangements, the one or more vehicle sensors 721 can be configured to detect and/or sense position and orientation changes of the vehicle 700 such as, for example, based on inertial acceleration. In one or more arrangements, the one or more vehicle sensors 721 can include one or more accelerometers, one or more gyroscopes, an inertial measurement unit (IMU), a dead-reckoning system, a global navigation satellite system (GNSS), a global positioning system (GPS), a navigation system 747, and/or other suitable sensors. The one or more vehicle sensors 721 can be configured to detect and/or sense one or more characteristics of the vehicle 700. In one or more arrangements, the one or more vehicle sensors 721 can include a speedometer to determine a current speed of the vehicle 700.

Alternatively or additionally, the sensor system 720 can include one or more environment sensors 722 configured to acquire and/or sense driving environment data. As used herein, "driving environment data" can include data or information about the external environment in which a vehicle is located or one or more portions thereof. For example, the one or more environment sensors 722 can be configured to detect, quantify, and/or sense obstacles in at least a portion of the external environment of the vehicle 700 and/or information/data about such obstacles. Such obstacles may be stationary objects and/or dynamic objects. The one or more environment sensors 722 can be configured to detect, measure, quantify, and/or sense other things in the external environment of the vehicle 700 such as, for example, lane markers, signs, traffic lights, traffic signs, lane lines, crosswalks, curbs proximate the vehicle 700, off-road objects, etc.

Various examples of sensors of the sensor system 720 are described herein. The example sensors may be part of the one or more vehicle sensors 721 and/or the one or more environment sensors 722. However, one of skill in the art understands that the embodiments are not limited to the particular sensors described.

In one or more arrangements, the one or more environment sensors 722 can include one or more radar sensors 723, one or more lidar sensors 724, one or more sonar sensors 725, and/or one more cameras 726. In one or more arrangements, the one or more cameras 726 can be one or more high dynamic range (HDR) cameras or one or more infrared (IR) cameras. For example, the one or more cameras 726 can be used to record a reality of a state of an item of information that can appear in the digital map.

The input system 730 can include any device, component, system, element, arrangement, or groups thereof that enable information/data to be entered into a machine. The input system 730 can receive an input from a vehicle passenger (e.g., a driver or a passenger). The output system 735 can include any device, component, system, element, arrangement, or groups thereof that enable information/data to be presented to a vehicle passenger (e.g., a driver or a passenger).

Various examples of the one or more vehicle systems 740 are illustrated in FIG. 7. However, one of skill in the art understands that the vehicle 700 can include more, fewer, or different vehicle systems. Although particular vehicle systems can be separately defined, each or any of the systems or portions thereof may be otherwise combined or segregated via hardware and/or software within the vehicle 700. For example, the one or more vehicle systems 740 can include a propulsion system 741, a braking system 742, a steering system 743, a throttle system 744, a transmission system 745, a signaling system 746, and/or the navigation system 747. Each of these systems can include one or more devices, components, and/or a combination thereof, now known or later developed.

The navigation system 747 can include one or more devices, applications, and/or combinations thereof, now known or later developed, configured to determine the geographic location of the vehicle 700 and/or to determine a travel route for the vehicle 700. The navigation system 747 can include one or more mapping applications to determine a travel route for the vehicle 700. The navigation system 747 can include a global positioning system, a local positioning system, a geolocation system, and/or a combination thereof.

The one or more actuators 750 can be any element or combination of elements operable to modify, adjust, and/or alter one or more of the vehicle systems 740 or components thereof responsive to receiving signals or other inputs from the one or more processors 710 and/or the one or more automated driving modules 760. Any suitable actuator can be used. For example, the one or more actuators 750 can include motors, pneumatic actuators, hydraulic pistons, relays, solenoids, and/or piezoelectric actuators.

The one or more processors 710 and/or the one or more automated driving modules 760 can be operatively connected to communicate with the various vehicle systems 740 and/or individual components thereof. For example, the one or more processors 710 and/or the one or more automated driving modules 760 can be in communication to send and/or receive information from the various vehicle systems 740 to control the movement, speed, maneuvering, heading, direction, etc. of the vehicle 700. The one or more processors 710 and/or the one or more automated driving modules 760 may control some or all of these vehicle systems 740 and, thus, may be partially or fully automated.

The one or more processors 710 and/or the one or more automated driving modules 760 may be operable to control the navigation and/or maneuvering of the vehicle 700 by controlling one or more of the vehicle systems 740 and/or components thereof. For example, when operating in an automated mode, the one or more processors 710 and/or the one or more automated driving modules 760 can control the direction and/or speed of the vehicle 700. The one or more processors 710 and/or the one or more automated driving modules 760 can cause the vehicle 700 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 770 can include one or more receivers 771 and/or one or more transmitters 772. The communications system 770 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 770 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 700 can include one or more modules, at least some of which are described herein. The modules can be implemented as computer-readable program code that, when executed by the one or more processors 710, implement one or more of the various processes described herein. One or more of the modules can be a component of the one or more processors 710. Alternatively or additionally, one or more of the modules can be executed on and/or distributed among other processing systems to which the one or more processors 710 can be operatively connected. The modules can include instructions (e.g., program logic) executable by the one or more processors 710. Alternatively or additionally, the one or more data store 715 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 700 can include one or more automated driving modules 760. The one or more automated driving modules 760 can be configured to receive data from the sensor system 720 and/or any other type of system capable of capturing information relating to the vehicle 700 and/or the external environment of the vehicle 700. In one or more arrangements, the one or more automated driving modules 760 can use such data to generate one or more driving scene models. The one or more automated driving modules 760 can determine position and velocity of the vehicle 700. The one or more automated driving modules 760 can determine the location of obstacles, obstacles, or other environmental features including traffic signs, trees, shrubs, neighboring vehicles, pedestrians, etc.

The one or more automated driving modules 760 can be configured to receive and/or determine location information for obstacles within the external environment of the vehicle 700 for use by the one or more processors 710 and/or one or more of the modules described herein to estimate position and orientation of the vehicle 700, vehicle position in global coordinates based on signals from a plurality of satellites, or any other data and/or signals that could be used to determine the current state of the vehicle 700 or determine the position of the vehicle 700 with respect to its environment for use in either creating a map or determining the position of the vehicle 700 in respect to map data.

The one or more automated driving modules 760 can be configured to determine one or more travel paths, current automated driving maneuvers for the vehicle 700, future automated driving maneuvers and/or modifications to current automated driving maneuvers based on data acquired by the sensor system 720, driving scene models, and/or data from any other suitable source such as determinations from the sensor data 719. As used herein, "driving maneuver" can refer to one or more actions that affect the movement of a vehicle. Examples of driving maneuvers include: accelerating, decelerating, braking, turning, moving in a lateral direction of the vehicle 700, changing travel lanes, merging into a travel lane, and/or reversing, just to name a few possibilities. The one or more automated driving modules 760 can be configured to implement determined driving maneuvers. The one or more automated driving modules 760 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 760 can be configured to execute various vehicle functions and/or to transmit data to, receive data from, interact with, and/or control the vehicle 700 or one or more systems thereof (e.g., one or more of vehicle systems 740). For example, functions and/or operations of an automotive navigation system can be realized by the one or more automated driving modules 760.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, 6A, 6B, and 7, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
an electromagnetic machine having a rotor, configured to be connected to a shaft, and a stator, one of the rotor or the stator having first windings and second windings; and
a controller configured to:
control first circuitry to cause energy to flow from a first energy storage device to the first windings to rotate the shaft,
control second circuitry to cause energy to flow selectively:
from a second energy storage device to the second windings to rotate the shaft, or
from the second windings to the second energy storage device to charge the second energy storage device, and
cause, in response to a determination that a state of charge of the first energy storage device is greater than a state of charge of the second energy storage device, the second circuitry to be in a state to cause the energy to flow from the second windings to the second energy storage device to charge the second energy storage device.

2. The system of claim 1, wherein the system is disposed on a vehicle.

3. The system of claim 1, wherein at least one of the first energy storage device or the second energy storage device comprises a battery.

4. The system of claim 1, wherein at least one of the first energy storage device or the second energy storage device comprises a capacitor.

5. The system of claim 1, wherein:
the first circuitry is configured to cause energy to flow selectively:
from the first energy storage device to the first windings to rotate the shaft, or
from the first windings to the first energy storage device to charge the first energy storage device, and
at least one of the first circuitry or the second circuitry comprises:
at least one inverter configured to cause energy to flow from at least one of the first energy storage device or the second energy storage device to at least one of the first windings or the second windings,
at least one rectifier configured to cause energy to flow from the at least one of the first windings or the second windings to the at least one of the first energy storage device or the second energy storage device, and
at least one switch configured to selectively connect the at least one of the first energy storage device or the second energy storage device to the at least one of the first windings or the second windings via the at least one inverter or the at least one rectifier.

6. The system of claim 1, wherein:
the electromagnetic machine comprises a first motor-generator and a second motor-generator,
the rotor comprises a first rotor, disposed on the first motor-generator, and a second rotor disposed on the second motor-generator,
the stator comprises a first stator, disposed on the first motor-generator, and a second stator disposed on the second motor-generator,
one of the first rotor or the first stator has the first windings, and
one of the second rotor or the second stator has the second windings.

7. The system of claim 6, wherein the first rotor and the second rotor are configured to be connected to the shaft.

8. The system of claim 6, wherein:
the shaft comprises a first shaft and a second shaft,
the first rotor is configured to be connected to the first shaft,
the second rotor is configured to be connected to the second shaft, and
the first shaft and the second shaft are configured to be connected, via at least one gear, to a third shaft.

9. The system of claim 8, wherein the third shaft comprises a driveshaft of a vehicle.

10. The system of claim 8, wherein a disposition of the third shaft is in line with a disposition of at least one of the first shaft or the second shaft.

11. The system of claim 8, wherein an angle other than zero degrees or 180 degrees is formed between a disposition of the third shaft and a disposition of at least one of the first shaft or the second shaft.

12. The system of claim 1, wherein the controller is further configured to:
receive first information indicative of the state of charge of the first energy storage device; and
receive second information indicative of the state of charge of the second energy storage device,
wherein a condition that warrants causing the second circuitry to be in the state to cause the energy to flow from the second windings to the second energy storage device further comprises the state of charge of the second energy storage device being less than a second threshold state of charge.

13. The system of claim 1, further comprising:
a first fuel cell system configured to cause energy to flow selectively to:
the first windings to rotate the shaft, or
the first energy storage device to charge the first energy storage device; and
a second fuel cell system configured to cause energy to flow selectively to:
the second windings to rotate the shaft, or
the second energy storage device to charge the second energy storage device.

14. The system of claim 13, wherein:
the controller is further configured to:
receive first information indicative of an amount of fuel in a tank of the first fuel cell system, and
receive second information indicative of an amount of fuel in a tank of the second fuel cell system, and
a condition that warrants causing the second circuitry to be in the state to cause the energy to flow from the second windings to the second energy storage device further comprises the amount of fuel in the tank of the first fuel cell system being greater than a first threshold.

15. The system of claim 14, wherein the condition further comprises the amount of fuel in the tank of the second fuel cell system being less than a second threshold amount.

16. The system of claim 13, wherein:
the controller is further configured to receive information indicative of a measure of a state of an operation of the second fuel cell system, and
a condition that warrants causing the second circuitry to be in the state to cause the energy to flow from the second windings to the second energy storage device further comprises the measure of the state of the operation of the second fuel cell system being outside a threshold range of measurements.

17. The system of claim 1, wherein:
the system is disposed on a vehicle, and
a condition that warrants causing the second circuitry to be in the state to cause the energy to flow from the second windings to the second energy storage device further comprises a situation favorable for performing a regenerative braking operation.

18. The system of claim 17, wherein the controller is:
further configured to analyze information about a topological relief along a path of travel of the vehicle, and
configured to determine, based on a result of an analysis of the information about the topological relief along the path of travel of the vehicle, the existence of the condition.

19. The system of claim 17, wherein the controller is:
further configured to analyze information about a measure of changes in a rate of flow of traffic along a path of travel of the vehicle, and
configured to determine, based on a result of an analysis of the measure of the changes in the rate of flow of traffic along the path of travel of the vehicle, the existence of the condition.

20. A controller, comprising:
first circuitry configured to cause energy to flow from a first energy storage device to first windings, of an electromagnetic machine, to rotate a shaft, the electromagnetic machine having a rotor and a stator, the rotor connected to the shaft, one of the rotor or the stator having the first windings and second windings;
second circuitry configured to cause energy to flow selectively:
from a second energy storage device to the second windings to rotate the shaft, or
from the second windings to the second energy storage device to charge the second energy storage device; and
third circuitry configured to cause, in response to a determination that a state of charge of the first energy storage device is greater than a state of charge of the second energy storage device, the second circuitry to be in a state to cause the energy to flow from the second windings to the second energy storage device to charge the second energy storage device.

21. The controller of claim 20, wherein the first circuitry is configured to cause energy to flow selectively:
from the first energy storage device to the first windings to rotate the shaft, or
from the first windings to the first energy storage device to charge the first energy storage device.

22. A method, comprising:
causing, by a controller, energy to flow from a first energy storage device to first windings, of an electromagnetic machine, to rotate a shaft, the electromagnetic machine having a rotor and a stator, the rotor connected to the shaft, one of the rotor or the stator having the first windings and second windings;
causing, by the controller, energy to flow selectively:
from a second energy storage device to the second windings to rotate the shaft, or
from the second windings to the second energy storage device to charge the second energy storage device; and
causing, in response to a determination that a state of charge of the first energy storage device is greater than a state of charge of the second energy storage device, the energy to flow from the second windings to the second energy storage device to charge the second energy storage device.

23. The method of claim 22, wherein the causing energy to flow from the first energy storage device to the first windings comprises causing energy to flow selectively:
from the first energy storage device to the first windings to rotate the shaft, or
from the first windings to the first energy storage device to charge the first energy storage device.

* * * * *